INVENTORS
OTHMAR SCHNEIDER
MARCEL HOSSMANN
GOTTFRIED TSCHANNEN

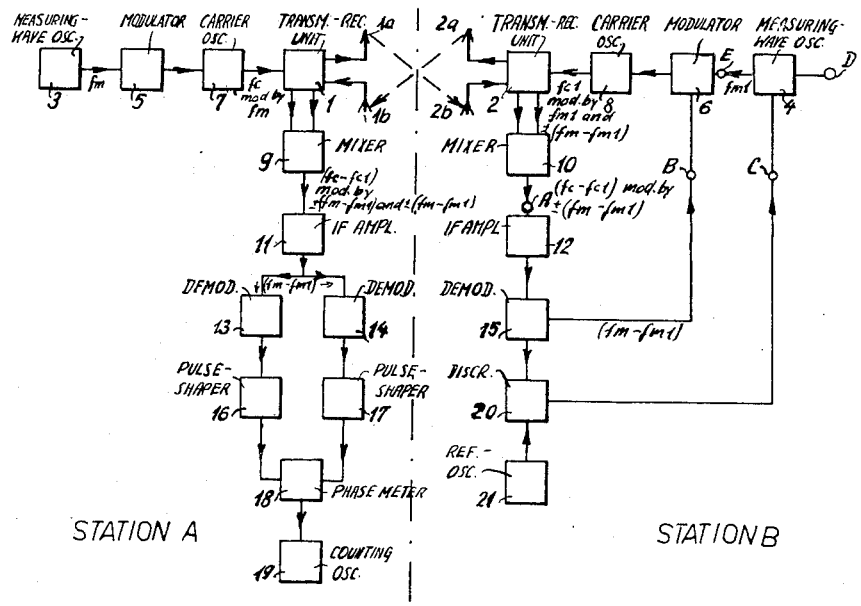
Fig.1
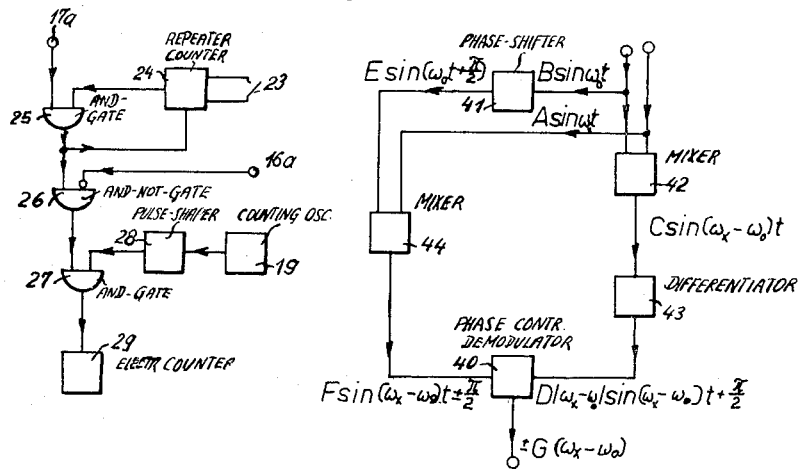
Fig.2
Fig.4
INVENTORS
OTHMAR SCHNEIDER
MARCEL HOSSMANN
GOTTFRIED TSCHANNEN

BY: McGlew and Toren

ATTORNEYS though the technology of crystal-stabilized oscillators is at quite an advanced state, such frequency deviations do occur.

3,200,399
DISTANCE MEASURING SYSTEM AND APPARATUS
Othmar Schneider, Urdorf, and Marcel Hossmann and Gottfried Tschannen, Zurich, Switzerland, assignors to Albiswerk Zurich A.G., Zurich, Switzerland
Filed Aug. 13, 1963, Ser. No. 301,840
Claims priority, application Switzerland, Aug. 15, 1962, 9,770/62
4 Claims. (Cl. 343—12)

This invention pertains, in general, to the measurement of distances between two points and, more particular to a system and apparatus in which at each of these points continuous electromagnetic wave energy (measuring wave) is transmitted and received at the other points. These two measuring waves have different frequencies and may be modulated upon suitable carrier waves. At both end points of the distance the received measuring wave is heterodyned with the transmitted measuring wave producing thereby a difference wave, of which the frequency is the difference between the frequencies of the two measuring waves. Both difference waves are therefore of the same frequency, but have a phase difference, one compared with the other, being an exact measure for the distance between the two points. From one of the two points the difference wave is transmitted to the other point e.g. by modulating the measuring wave, for measuring the phase difference between this received difference wave and the difference wave produced at this point itself. From this phase difference the distance between the two points may be calculated in a well known manner.

The precision with which distances can be measured with systems of the kind above described is determined by the precision with which the phase difference of the two difference waves can be determined. Extreme accuracy in measuring the phase difference is required, for example in the order of $10^{-3}$ to $10^{-4}$.

For known reasons the frequency of the difference waves are to be much lower than the frequencies of the measuring waves; for example in the ratio of $1:10^4$ to $1:10^5$. Therefore even very minute deviations in the frequency of the measuring waves occasion relatively large frequency deviations of the difference waves. Even though the technology of crystal-stabilized oscillators is at quite an advanced state, such frequency deviations do occur.

In order to measure the phase difference between the difference waves, the frequency deviations of these waves require a sufficient large band width of the phase measuring device, as measuring errors would occur due to the non-linear phase response. Phase measuring devices with the required exactness and the large bandwidth can only be realized with considerable expenditure and highly complex circuit arrangements.

With other known systems for determining the distance, the sinusoidal difference wave obtained by heterodyning the transmitted and received measuring waves is subsequently shifted in phase by $\pi/2$ radians. This shifted difference wave and the unshifted original difference wave are fed each, after being amplified, to a pair of deflection plates of a cathode ray tube. This results in the appearance, on the screen of this tube, of the image of a circle. The other difference wave, transmitted from the other station, serves for modulating the image. Due to the narrow band pass characteristic of the phase shifting circuit, a frequency deviation occasions a deformation of the image, i.e. the image, instead of being a circle, deviates from this form.

By adjusting the frequency of one of the measuring waves, the image on the screen of the cathode ray tube will resume a circular form. Thus, the frequency of the oscillation with difference frequency may be corrected to stay within permissible limits to ensure accuracy of distance measurement. However, this procedure is disadvantageous in that a highly skilled human operator is required to carry out the correction procedure. As a result, the precision of the phase difference measurement is dependent upon the capabilities of the operator. A further disadvantage resides in that the adjustments of the measuring frequency can be accomplished only relatively slowly because the initial deviation must first be ascertained. In addition, such a correction procedure is unsuited for use in phase difference measuring systems where a digital indication of the phase difference is required.

Accordingly, one object of the present invention is to provide new and improved distance measuring system and apparatus.

Another object of the present invention is to provide a distance measuring system and apparatus wherein the measurement of distance may be achieved with a high degree of reliability and precision.

Another object of the present invention is to provide distance measuring apparatus wherein the frequency of the oscillation with difference frequency is maintained substantially constant by automatic adjustment of the frequency of the continuous electromagnetic wave (measuring wave) transmission of one of the transmitters employed.

Another object of the present invention is to provide distance measuring apparatus wherein the digital indication of the phase difference is possible.

Another object of the present invention is to provide measuring apparatus rendering possible the measurement of the distance between two points in either direction with two identical apparatuses.

Another object of the present invention is to provide measuring apparatus reliable for measuring the sides of a triangle by trilateration methods with only three apparatuses.

Another object of the present invention is to provide distance measuring apparatus which is highly reliable, accurate and simple.

According to the distance measuring system provided by the present invention, two transmit-receive units are employed. One unit is located at one terminal point of the path to be measured, while the other unit is located at the other terminal point. Each transmitter sends out a continuous electromagnetic wave (measuring wave). The two measuring waves have a different frequency. If desired, each measuring wave may be transmitted as the modulating signal on a carrier wave. In the receiver sections of both units, the received measuring wave is mixed with the transmitted measuring wave and, as a result, an oscillation with difference frequency is derived. These two oscillations with difference frequency have a phase difference relative to one another, the phase difference being dependent upon the distance between the two transmit-receive units. The oscillation with difference frequency derived in one of the transmit-receive units at one of the path terminal points is transmitted as a modulating signal to the transmit-receive unit at the other terminal point of the path. At this other transmit-receive unit there occurs a demodulation of the received oscillation with difference frequency which is being transmitted as a modulating signal. Subsequently, the phase difference between the oscillation with difference frequency which has been obtained by demodulation and the oscillation with difference frequency which has been obtained by mixing the transmitted and received measuring waves is derived in a phase difference measuring circuit. Knowing the electrical phase difference, the distance between the two terminal points of the path may be calculated.

An important feature of the present invention is the employment of a frequency discriminator wherein the frequency of the oscillation with difference frequency is compared with a fixed frequency of a comparison oscillator. After comparison, an adjusting signal is derived which has an amplitude depending on the difference between the fixed frequency and the frequency of the oscillation with difference frequency. With the adjusting signal so derived, the frequency of a continuous electromagnetic measuring wave transmitted by one of the transmit-receive units is adjusted so that the frequency of the oscillation with difference frequency is corrected to a predetermined stabilized value.

The various features of novelty which characterize the invention are pointed out with particularity in the claims annexed to and forming a part of this specification. For a better understanding of the invention, reference should be had to the accompanying drawings and descriptive matter in which there are illustrated and described preferred embodiments of the invention.

In the drawings:

FIG. 1 is a block diagram of the measuring system and apparatus according to the present invention;

FIG. 2 is a block diagram of the phase difference measuring system and apparatus employed in the present invention;

FIG. 4 is a block diagram of a frequency discriminator employed in the system and apparatus of the invention.

Figure 3:
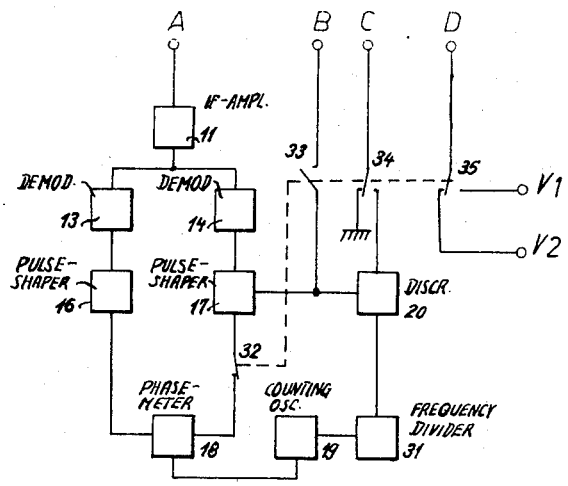
FIG. 3 is a block diagram of another embodiment of the distance measuring system and apparatus of the invention wherein either of the transmit-receive units of FIG. 1 may be modified so that the transmit-receive units may be used as either a main or an auxiliary station.

In FIG. 1, station A is the main station and station B is the remotely situated auxiliary station. At station A there is included a transmit-receive unit 1 with a transmitting antenna 1a and a receiving antenna 1b; and, at station B there is also included a transmit-receive unit 2 with a transmitting antenna 2a and a receiving antenna 2b. An oscillator 3 is provided at station A for generating a continuous measuring wave ($fm$) from station A. Similarly, an oscillator 4 is provided at station B for generating the continuous measuring wave ($fm1$) from station B. Each station A and B also includes a separate carrier wave oscillator 7 and 8; the frequencies ($fc$) and ($fc1$), respectively, of the carrier oscillators 7 and 8 differ from each other by a frequency equal to the intermediate frequency. A modulator 5 is provided at station A for modulating the carrier wave ($fc$) of the carrier oscillator 7 with the measuring wave ($fm$) generated by oscillator 3. Similarly, at station B a modulator 6 is provided for modulating the carrier wave ($fc1$) of the oscillator 8 with the measuring wave ($fm1$) generated by the oscillator 4. The mixers 9 and 10 are coupled with the transmit-receive units 1 and 2 at stations A and B, respectively. The intermediate frequency amplifiers 11 and 12 coupled with the mixers 9 and 10, respectively, include narrow-band filter circuits. At station A, two demodulators 13 and 14 are provided, while, at station B, the demodulator 15 is provided. The demodulators 13 and 14 at station A are coupled with the intermediate frequency amplifier 11 and the demodulator 15 at station B is coupled with the intermediate frequency amplifier 12. At station A a pulse shaping circuit 16 is coupled with the demodulator 13 and another pulse-shaping circuit 17 is coupled with the demodulator 14. Also, at station A, a phase difference measuring circuit 18 is coupled with the pulse-shaping circuits 16 and 17. A counting oscillator 19 is coupled with the phase difference measuring circuit 18 for the purpose of deriving the phase difference in digital form.

At station B a frequency discriminator 20 is coupled with the demodulator 15. A reference oscillator 21 is provided for the purpose of feeding a fixed, or comparison, frequency to the frequency discriminator 20.

As stated hereinbefore, the oscillators 7 and 8 at stations A and B, respectively, generate the carrier waves ($fc$) and ($fc1$) respectively, which are modulated by means of the modulators 5 and 6, by the measuring waves ($fm$) and ($fm1$), respectively, produced by the continuous wave oscillators 3 and 4, respectively. The precision with which the unknown distance can be measured depends upon the frequency stability of the oscillator 3 at the main station A. Most of the radiated energy of the modulated carrier wave from the transmit-receive unit 1 is radiated from the radiating antenna 1a to the receiving antenna 2b of the transmit-receive unit 2; similarly, most of the modulated carrier wave energy radiated from the transmitting antenna 2a is received by the receiving antenna 1b at station A, while a relatively smaller portion of the radiated energy is fed from the transmit-receive units 1 and 2 as local oscillator signals to the mixers 9 and 10 at stations A and B, respectively. As is known, the transmitting and receiving antennae 1a, 1b, 2a and 2b of the transmit-receive units 1 and 2 are directional antennae. More particularly, the modulated carrier waves radiated by the transmit-receive units 1 and 2 are received at the directional receiving antennae 2b and 1b, respectively. In other words, each transmit-receive unit 1 and 2 shown in FIG. 1 receives a modulated carrier signal from the other station and also feeds the modulated carrier signal of its own carrier oscillator, together with the received signal, to the mixers 9 and 10, respectively. Only the oscillations with difference frequency at the intermediate frequency and the nearest adjacent side bands are passed and amplified in the narrow band pass intermediate frequency amplifiers 11 and 12 at stations A and B, respectively. If the measuring waves are frequency modulated upon the carrier waves, then, as is well known, rejection of all side bands except the nearest adjacent side bands occasions an amplitude modulation. Subsequently, these amplitude modulated signals are detected, or demodulated, in the demodulators 14 and 15 at stations A and B and, as a result, the oscillations with difference frequency of the modulated measuring waves are derived. The difference frequency modulating signals have a sine wave character. At station A the pulse-shaping circuit 17 forms suitably shaped pulses from the sinusoidal wave difference frequency signal. These pulses serve as trigger signal pulses for the phase difference measuring circuit 18 to initiate a counting operation. More particularly, signals from the counting oscillator 19 are converted by the phase difference measuring circuit 18 into a train of pulses, i.e., the counting pulses.

The sinusoidal oscillations with difference frequency ($fm-fm1$) derived from the demodulator 15, at station B, are fed back to the modulator 6 as well as to the frequency descriminator 20. A pulse-shaping circuit can be interposed between the demodulator 15 and the modulator 6 at station B so that the phase position of the oscillation with the difference frequency is characterized by pulses which can be superimposed as a second modulating signal on the carrier wave ($fc1$) generated by the carrier wave oscillator 8. In the lack of such a pulse shaper, the oscillation with difference frequency is modulated in its sinusoidal wave form. The second modulating signal, when received at station A, passes through the intermediate frequency amplifier 11 without being affected therein and, subsequently, is recovered at the output of amplifier 11 by the demodulator 13. If this second modulating signal is transmitted in the sinusoidal form, the pulse-shaping circuit 16 is required. The output pulses from this pulse-shaping circuit 16 are fed to the phase difference measuring circuit 18 and serve as stop pulses for the counting operation.

At station B the, demodulated oscillation with difference frequency ($fm-fm1$) from the output of the demodulator 15 is compared in the frequency discriminator 20 with the fixed reference frequency received from the reference oscillator 21. An error voltage signal derived by the comparison operation is supplied at input terminal C to a voltage controllable frequency adjusting circuit of the oscillator 4 whereby the frequency of the oscillator 4 is adjusted so that it oscillates at a constant predetermined frequency relative to the frequency of the oscillator 3.

The phase difference measuring circuit 18 of FIG. 1 is illustrated schematically in block diagram form in FIG. 2. Input signals from the pulse-shaping circuits 16 and 17 (FIG. 1) are received at the terminals 16a and 17a, respectively. Also included is a switch 23 which, when it is closed, initiates the measuring operation; an electronic repeater counter 24; the logic circuits 25, 26 and 27; a pulse-shaping circuit 28; an electronic counter 29; and the counting oscillator 19, the counting oscillator 19 being the same oscillator as shown at station A at FIG. 1.

The phase difference measuring circuitry illustrated at FIG. 2 measures the phase difference between the input signals received at the input terminals 16a and 17a. When the switch 23 is closed, the measuring operation is initiated. As a result of closing the switch 23, the electronic repeater counter 24 is put into operation. The operation of the electronic repeater counter 24 determines the number of periods given by a trigger and a stop-impulse to be counted; the repeater counter 24 may, as is well known, be comprised of a plurality of binary counting stages. More particularly, the electronic repeater counter 24 supplies a potential to the AND gate 25. The AND gate 25, as a result, becomes conductive for the trigger impulses from the pulse-shaping circuit 17 at the terminal 17a. These trigger pulses received at the input 17a are counted by the electronic repeater counter 24 and fed to an AND-NOT gate 26, which continues to operate until the next stop pulse is received from the pulse-shaping circuit 16 at the input terminal 16a. Specifically, an input stop pulse signal from the pulse-shaping circuit 16 establishes a potential at the input of the AND gate circuit 27 which, as a result, becomes conductive for the counting pulses which emanate from the pulse-shaping circuit 28. The counting pulses initially produced by the counting oscillator 19 are suitably shaped in the shaping circuit 28. The counting pulses passing through the AND gate 27 are accumulated in the electronic counter 29. This operation is a repetitive one, i.e., repeated for the number of periods which is determined by the electronic repeater counter 24. The number of counting pulses which have been accumulated (counted) in the electronic counter 29 is determinative of the electrical phase difference between the oscillations with difference frequency.

Referring now to FIG. 3, therein illustrated is supplementary circuitry, in block diagram form, of electrical stages which are intended to supplement the circuitry of stations A and B (FIG. 1) so that when the circuitry of FIG. 3 is added the resultant combination may be operated as both a main and also an auxiliary station.

Referring momentarily to FIG. 1, there shown at station B are the terminals A, B, C and D. The circuitry of FIG. 3 is connected to these terminals in the way illustrated. When the switches 32, 33, 34 and 35 are in the position shown in FIG. 3, the system is set to function as a main station; i.e., like station A. More particularly, the oscillation with difference frequency output signals from the intermediate frequency amplifier 11 are demodulated in the demodulator 13 and in the demodulator 14. The associated pulse-shaping circuits 16 and 17 feed pulses to the phase difference measuring circuit 18. This circuit 18 is fed by the counting pulses from the counting oscillator 19. Switch 35 supplies via the terminal D a constant biasing potential V2 to the voltage-controllable frequency shifting circuit of the oscillator 4. Thus, the oscillator 4 is adjusted to the frequency required for main station operation. At the input terminal C to the same frequency shifting circuit in oscillator 4 there is provided a ground connection, as illustrated, through the switch means 34. Switch 33 (FIG. 3) is for the purpose of disconnecting the discriminator circuit 20 from the modulator 6.

As may be appreciated from FIG. 3, when the switches 32, 33, 34 and 35 are reversed (switched so that they are connected with another pole thereof) the system is set to function as an auxiliary station. The phase difference measuring apparatus 18 is disconnected from the pulse-shaping circuit 17. Thus, trigger pulses are not received from the pulse-shaping circuit 17. However, when switch 35 is reversely actuated so that it comes into contact with the biasing potential V1, the voltage-controllable frequency shifting circuit in the oscillator 4 is biased by the potential V1 and, as a result, the frequency of the continuous wave measuring oscillator 4 is instantaneously shifted with respect to the frequency of the oscillation with difference frequency.

The output signal emanating from the pulse-shaping circuit 17 is fed by means of switch 33 to terminal B and further to the modulator 6 (FIG. 1). Also, this signal is sent to the frequency discriminator 20. The frequency of the signal of the counting oscillator 19 is fed through a frequency divider circuit 31 to obtain a signal having a frequency the same as the frequency of the reference oscillator 21. Then, the frequency divided signal is fed to the frequency discriminator 20. A control voltage signal (error voltage signal) of the discriminator 20 is fed through the terminal C to control the frequency of the oscillator 4 (FIG. 1) in such manner that this signal frequency of oscillator 4 deviates from the frequency of the oscillator of the main station by an amount such that it is exactly equal to the frequency of the reference frequency derived from the frequency divider 31.

The modifying arrangement according to FIG. 3 is highly advantageous. More particularly, in the mass production of the distance measuring apparatus, the modifying arrangement allows a high degree of simplification such that both main station and auxiliary station operation is enabled. Distance measurement between two points may be accomplished in both directions and the measurement of the sides of a triangle according to trilateration methods can also be performed with considerable ease.

Since the measurement of phase difference is a highly important operation according to the present invention, the frequency stability of the counting oscillator 19 is required to be held within narrow limits. And, since the accuracy of the distance measurement also depends upon the stability of the oscillation with difference frequency, a reference oscillator 21 having a stabilized frequency output is required. According to the invention, therefore, it is possible to use the counting oscillator 19 as a reference oscillator, as described with respect to FIG. 3.

In FIG. 4 there is illustrated, in block diagram form, a frequency discriminator employed in the circuitry shown in FIGS. 1 and 3. As illustrated, the frequency discriminator comprises a phase controlled demodulator 40, a phase shifting circuit 41, a mixing circuit 42, a differentiating circuit 43 and a second mixing circuit 44.

In FIG. 4 the oscillation signal $A \sin \omega_x t$ is the oscillation signal to be adjusted, or corrected, while the oscillation signal $B \sin \omega_0 t$ is the reference oscillation signal. Both of these signals are fed to the mixing circuit 42 which, for example, may be the well known ring modulator. A low-pass filter in the mixing circuit 42 is effective to permit only the oscillation signal with difference frequency $C \sin (\omega_x-\omega_0)t$ to appear at the output of the mixing circuit 42. Subsequently, this oscillation signal, $C \sin (\omega_x-\omega_0)t$, is fed to a differentiating circuit 43. As a result of differentiating this oscillation signal, there is formed an oscillation signal $$D|\omega_x-\omega_0| \cos (\omega_x-\omega_0)$$

the amplitude of which is frequency-dependent. This signal is fed to the input of a phase controlled demodulator 40. The phase of reference oscillation signal $B \sin \omega_0 t$ is shifted in the phase shifting circuit 41 by $\pi/2$ radians and is subsequently mixed in the second mixing circuit 44 with the oscillation signal $A \sin \omega_x t$ which is to be adjusted. (The mixing circuit 44 may be the same electrical arrangement as that of the mixing circuit 42. The low pass filter in the mixing circuit 44 permits only the oscillation signal with difference frequency to appear at the output thereof. This oscillation has the mathematical form $$F \sin [(\omega_x-\omega_0)t+\pi/2], \text{ or } F \sin [(\omega_0-\omega_x)t-\pi/2]$$

depending on whether $\omega_x$ is larger or smaller, respectively, than $\omega_0$. Thus, when the angle frequency passes the value $\omega_x=\omega_0$, the phase of the signal shifts by $\pi$ radians. This oscillation is used as a switching signal for the phase controlled demodulator 40 whereby the oscillation $D |\omega_x-\omega_0| \sin [(\omega_x-\omega_0)t+\pi2]$ is rectified so that there is obtained at the output of demodulator 40 a direct current potential signal $\pm G|\omega_x-\omega_0|$, whose plus or minus sign indicates whether or not the frequency to be adjusted is too high or too low; the amplitude of this signal being proportional to the frequency deviation.

Figure 5:
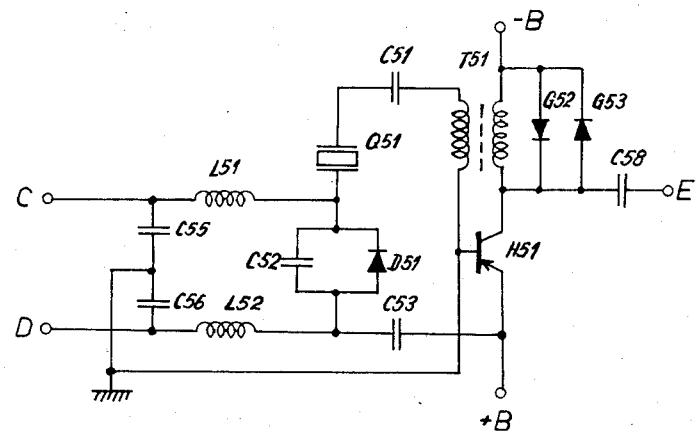
FIG. 5 is a schematic diagram showing an oscillator circuit employing a frequency adjusting circuit according to the present invention.

The frequency-adjustable crystal-controlled oscillator 4 of FIG. 1 is illustrated schematically at FIG. 5. The terminals C, D and E are intended to be connected to the same letter-designated terminals as indicated in FIG. 1.

As shown in FIG. 5, there is an amplifying transistor H51 having emitter, base and collector electrodes. The base electrode is grounded. The emitter electrode is directly coupled to a positive (+) terminal of a direct current voltage source B. The collector electrode is directly connected to one side of one of the windings of a transformer T51; the other side of this transformer winding being directly connected to the negative (−) terminal of the direct current voltage source B. Connected in parallel across the said winding of the transformer T51 are the tow amplitude-limiting, or clipping, diodes G52 and G53, as shown. A capacitor C58 is serially coupled between the parallel-connected diodes G52 and G53 and the output terminal E, which is to be connected to the modulator 6 (FIG. 1). One side of the other winding of the transformer T51 is connected to ground, as shown. Connected in series with the other side of this other winding of transformer T51, as shown in FIG. 5, is the tuning capacitor C51, the piezoelectric crystal Q51 and the inductive reactor L51; one side of the inductive reactor L51 being connected to terminal C (the input to oscillator 4, as shown in FIG. 1). Connected between the emitter electrode of the transistor H51 and terminal D (another input of oscillator 4) are the series-connected capacitor C53 and the inductive reactor L52. Two capacitors C55 and C56 are connected in series between the terminals C and D. As shown at FIG. 5, in a point intermediate these two capacitors, C55 and C56, conductor means are provided for connecting this intermediate point to ground. As shown in FIG. 5, a capacitor C52 and another diode G51 are connected in parallel and one side of this parallel arrangement is connected between the crystal Q51 and the inductive reactor L51. The other side of the parallel-connected capacitor and diode, C52 and G51, is connected between the direct current decoupling capacitor C53 and the inductive reactor L52.

The transformer T51 acts as a load on the amplifying transistor H51 which is connected in the well known grounded-base configuration. From the secondary winding of the transformer T51, there is fed back a portion of the output voltage to the emitter of the transistor H51 via the capacitor C51, the piezoelectric resonator Q51 and the adjusting capacitance comprising the parallel-connected diode G51 and capacitor C52 and, ultimately, through the decoupling capacitor C53. The crystal Q51 is in a series resonant circuit.

The diodes G52 and G53 are amplitude-limiting diodes and thus are effective to limit the amplitude of the output signal which is fed to terminal E through the capacitor C58. Advantageously, this output is fed through an isolation stage in order to prevent reaction of the load back to the oscillator circuit. The oscillator power supply is provided by the direct current potential source having the terminals +B and −B.

Frequency adjustment is achieved by controlling the capacitance provided by the diode G51 and the capacitor C52. Silicon diode G51 is operated in its non conducting region and its capacitance is dependent upon the direct current voltage applied thereto. The controllable capacitance provided by the capacitor C52 and the diode G51 acts as a variable frequency control reactance in the series resonant circuit including the crystal Q51 and causes a change of the frequency at which the series circuit resonates. A variable blocking voltage for the diode G51 is applied between the terminals C and D. The chokes L51 and L52 together with the capacitors C55 and C56 comprise a low pass filter stage. As a control voltage, the voltage of the frequency discriminator 20 (FIG. 1) is available. The voltage of the discriminator 20 can assume both negative and positive going values. Accordingly, a corresponding constant voltage in series with this control voltage is required so that diode G52 operates in the correct voltage range. Therefore, the control voltage may be applied to the input terminal C and at input terminal D a negative potential of suitable magnitude is supplied, which negative potential is also used for shifting the frequency of the measuring wave by an amount equal to the frequency of the oscillation with difference frequency upon switching from main station operation to auxiliary station operation or vice versa.

While specific embodiments of the invention have been shown and described in detail to illustrate the application of the principles of the invention, it will be understood that this invention may be embodied otherwise without departing from such principles.

What is claimed is:

1. In a distance measuring system including first and second stations arranged at respective terminal points of the distance to be measured, means at each station for transmitting, to the other station, continuous electromagnetic measuring waves, the two measuring waves differing in frequency, means at each station for receiving the measuring wave transmitted from the other station, means at each station for mixing the measuring wave transmitted therefrom with the measuring wave received thereat from the other station to derive oscillations with difference frequency, means at each station for transmitting the oscillation with difference frequency derived thereat to the other station as a modulating signal, and means at one station operable to determine the phase difference between the oscillation with difference frequency derived thereat and the oscillation with difference frequency received thereat from the other station: the improvement comprising means at one station for comparing the oscillation with frequency difference derived thereat with a fixed frequency to derive an error signal; and means operable to apply said error signal to the electromagnetic measuring wave generating means of said last-named one station to control the latter to maintain a fixed frequency difference between the electromagnetic measuring waves generated at the two stations.

2. In a distance measuring system, the improvement claimed in claim 1, in which said improvement comprises a reference oscillator for providing a constant frequency, a frequency discriminator for comparing the constant frequency of the reference oscillator with the frequency of the oscillation with difference frequency, and circuit means responsive to the frequency difference between the oscillation with difference frequency and said constant frequency for providing automatic adjustment of the frequency of the measuring wave transmitted from said last-named one station.

3. In a distance measuring system, the improvement claimed in claim 1, in which said relative phase difference determining means includes an oscillation generator of high frequency pulses; digital counting means, including said oscillation generator of high frequency pulses, effective to determine the relative phase difference digitally; and a frequency divider connected to the output of said oscillation generator of high frequency pulses and constituting, with said oscillation generator of high frequency pulses, the means providing said constant frequency for comparison purposes.

4. In a distance measuring system, the improvement claimed in claim 1, including phase difference determining means at said second-named other station identical with the same means at said first-named one station; and means for selectively connecting the phase difference determining means at said second-named other station into the circuitry of said second-named other station or disconnecting it therefrom.

References Cited by the Examiner
UNITED STATES PATENTS

| | | | |
|---|---|---|---|
| 2,198,113 | 4/40 | Holmes | 343—12 |
| 2,528,119 | 10/50 | Crosby | 343—12 |
| 2,907,999 | 10/59 | Wadley | 343—12 |

CHESTER L. JUSTUS, *Primary Examiner.*